UNITED STATES PATENT OFFICE.

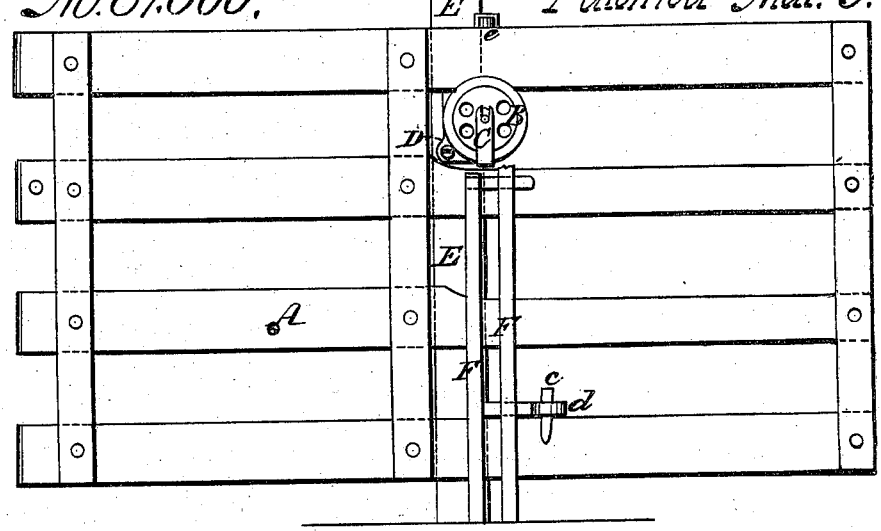
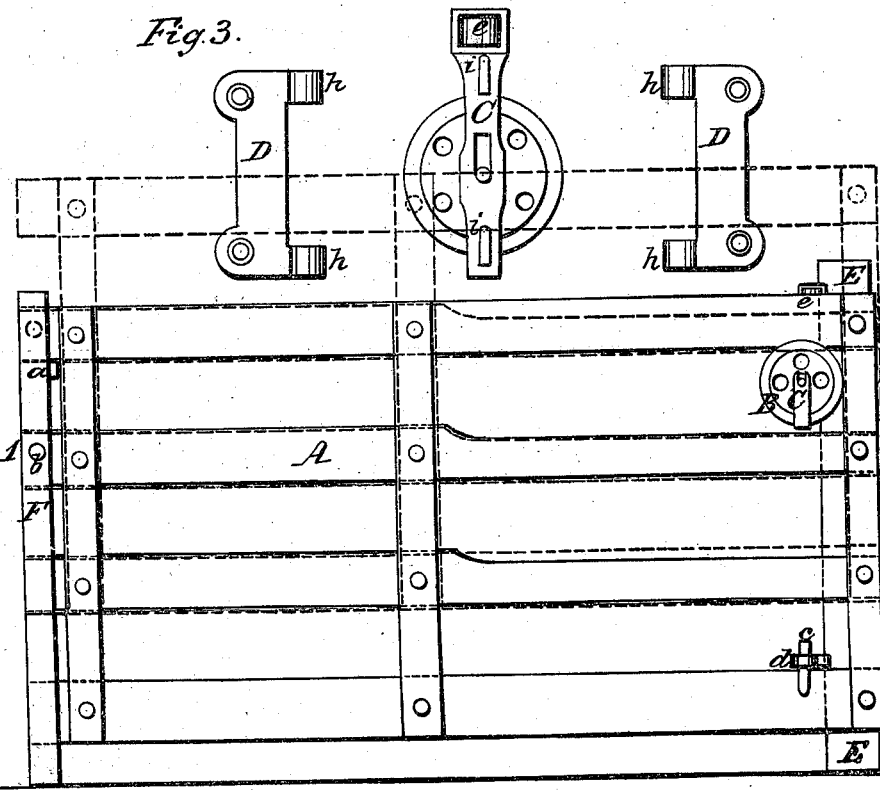

JOHN G. TALBOT, OF SLOANSVILLE, NEW YORK.

Letters Patent No. 87,600, dated March 9, 1869.

IMPROVEMENT IN FARM-GATES.

The Schedule referred to in these Letters Patent and making part of the same.

*To all whom it may concern:*

Be it known that I, JOHN G. TALBOT, of Sloansville, Schoharie county, in the State of New York, have invented an Improved Farm-Gate; and I hereby declare the following to be a full and exact description thereof, reference being had to the accompanying drawings, forming part of this specification.

The nature or essence of my invention consists in applying certain improvements to the gate for which I obtained Letters Patent, dated June 11, 1867; said improvements being the several combinations, hereinafter expressed, of the devices specified.

In the accompanying drawings, hereinbefore mentioned, the gate A, when closed, as shown in Figure 1, is supported at one end by the pulley B, in the bracket C, which is hinged upon the stand D, fastened upon the post E, and at the other end by the cross-piece $a$, connecting the two parts of the post F; the projecting ends of the bars or slats of the gate being held between said parts, as indicated by dotted lines in the figure, the pin $b$ also passing through these parts, and through one of the bars, to fasten the gate securely.

The bottom of the gate is held in place by the pin $c$, inserted through the arm $d$, projecting from the post E.

To open the gate, the pin $b$ is drawn out, and the gate run back on the pulley B, until it is balanced, or nearly balanced upon the pulley, when it may be swung around upon the hinged bracket C, to a position at right angles to its former position, as shown in Figure 2, so as to leave the gate-way open and free; the bottom of the gate being still held by the pin $c$.

To prevent the bar of the gate from being rubbed and worn, when the gate is pushed back or drawn forward, a friction-roller, $e$, is placed in the bracket C, for the bar to rest against.

The stand D, upon which the pulley-bracket is hinged, (see Figure 3,) has two eyes, or sockets, $h\ h$, to receive the pivots $i\ i$ upon the bracket, said stand being made symmetrical as to its flat sides and ends, so that it may be fastened on either face of the post, either side out, and either end up.

When it is required to raise the gate clear of snow, or so as to allow sheep and other small animals to pass under, while it stops cattle, the pin $c$ is taken out and the gate lifted, so as to place the second bar of the gate from the top, upon the pulley B, as shown in red on fig. 1.

Another arm, like $d$, may be inserted in the post E, adapted to the height of the gate, when thus raised, if thought necessary or desirable.

The foregoing being a description of my improvements in farm-gates—

1. I claim connecting the hinged bracket C to the stand D, on the post, by means of two pivots and corresponding eyes, substantially as described.

2. In combination with the swinging bracket C, having two pivots $i\ i$, I claim the reversible stand D, with two eyes or sockets, $h\ h$, to receive said pivots, substantially as and for the purpose set forth.

3. In combination with the pulley-bracket C, hinged or pivoted upon the stand D, as described, I claim the friction-roller $e$, arranged in the bracket-plate, substantially as shown and described.

4. And in combination with said pulley-bracket C, hinged in the manner described, I also claim the arm $d$, with its loose pin $c$, substantially as and for the purpose set forth.

JOHN G. TALBOT.

Witnesses:
JAMES B. MCMASTER,
WILLIAM J. SHOUT.